(12) United States Patent
Reblewski et al.

(10) Patent No.: US 6,594,810 B1
(45) Date of Patent: Jul. 15, 2003

(54) RECONFIGURABLE INTEGRATED CIRCUIT WITH A SCALABLE ARCHITECTURE

(75) Inventors: Frederic Reblewski, Paris (FR); Olivier Lepape, Paris (FR)

(73) Assignee: M2000 (FR)

( * ) Notice: Subject to any disclaimer, the term of this patent is extended or adjusted under 35 U.S.C. 154(b) by 0 days.

(21) Appl. No.: 09/971,349

(22) Filed: Oct. 4, 2001

(51) Int. Cl.⁷ .............................................. G06F 17/50
(52) U.S. Cl. .............................. 716/12; 716/16; 716/17
(58) Field of Search .......................... 716/1–21; 326/41, 326/39, 40

(56) References Cited

U.S. PATENT DOCUMENTS

| | | |
|---|---|---|
| 4,020,469 A | 4/1977 | Manning |
| 4,642,487 A | 2/1987 | Carter |
| 4,700,187 A | 10/1987 | Furtek |
| 4,918,440 A | 4/1990 | Furtek |
| 5,208,491 A | 5/1993 | Ebeling et al. |
| RE34,363 E | 8/1993 | Freeman |
| 5,255,203 A | 10/1993 | Agrawal et al. |
| 5,260,610 A | 11/1993 | Pedersen et al. |
| 5,396,126 A | 3/1995 | Britton et al. |
| 5,455,525 A | 10/1995 | Ho et al. |
| 5,457,410 A | 10/1995 | Ting |
| 5,519,629 A | 5/1996 | Snider |
| 5,574,388 A | 11/1996 | Barbier et al. |
| 5,594,363 A | 1/1997 | Freeman et al. |
| 5,648,911 A * | 7/1997 | Grodstein et al. ............ 716/18 |
| 5,742,181 A | 4/1998 | Rush |
| 5,796,268 A | 8/1998 | Kaplinsky |
| 5,825,203 A | 10/1998 | Kusunoki et al. |
| 6,088,526 A | 7/2000 | Ting et al. |
| 6,137,308 A | 10/2000 | Nayak |
| 6,204,688 B1 | 3/2001 | Cliff et al. |
| 6,215,326 B1 | 4/2001 | Jefferson et al. |
| 6,218,859 B1 | 4/2001 | Pedersen |
| 6,259,272 B1 | 7/2001 | Cliff et al. |
| 6,294,928 B1 | 9/2001 | Lytle et al. |
| 2002/0113619 A1 * | 8/2002 | Wong ........................... 326/41 |

FOREIGN PATENT DOCUMENTS

FR 2660510 10/1991

OTHER PUBLICATIONS

Xilinx, Inc.; Virtex 2.5 V Field Programmable Gate Arrays, Product Specification, DS003–2 (v2.6); Jul. 19, 2001.

Xilinx, Inc., XC4000E and XC4000X Series Field Programmable Gate Arrays, Product Specification, (v1.6); May 14, 1999.

Xilinx, Inc.; XC3000 Series Field Programmable Gate Arrays (XC3000A/L, XC3100A/L), (v3.1); Nov. 9, 1998.

(List continued on next page.)

*Primary Examiner*—Vuthe Siek
*Assistant Examiner*—Magid Dimyan
(74) *Attorney, Agent, or Firm*—Schwabe, Williamson & Wyatt, P.C.

(57) ABSTRACT

An integrated circuit (IC) includes a number of function blocks (FB), of which at least one is re-configurable. Each of the FBs may be a reconfigurable function or a non-reconfigurable function or recursively expanded with additional "nested" function blocks. The IC further includes a number of input pins, a number of output pins, and a number of crossbar devices. The elements, at least at the IC level, are coupled in a manner such that all input signals are provided to the FBs through a first subset of the crossbar devices, all internal signals are routed from one FB to another FB through a second subset of crossbar devices, and all output signals are routed from the FBs to the output pins through a third subset of crossbar devices. To increase routability and speed each of the crossbar device output has a single fanout. Additionally, each of the crossbar devices may provide only one input to each other crossbar device.

17 Claims, 7 Drawing Sheets

OTHER PUBLICATIONS

R. Amerson, R. Carter, W. Culbertson, P. Kuekes, G. Snider; Plasma: An FPGA for Million Gate Systems ; FPGA 1996.

Dwight D. Hill, Daniel R. Cassiday; Preliminary Description of Tabula Rasa, an Electrically Reconfigurable Hardware Engine; IEEE International Conference on Computer Design: VLSI in Computer & Processors (Sep. 1990); pp. 391–395.

Jonathan Rose, Robert J. Francis, David Lewis, Paul Chow; Architecture of Field–Programmable Gate Arrays: The Effect of Logic Block Functionality on Area Efficiency; IEEE Journal of Solid–State Circuits (Oct. 1990), vol. 25, No. 5, pp. 1217–1225.

Paul Chow, Soon Ong Seo, Jonathan Rose, Kevin Chung, Gerard Paezmonzon, Immanuel Rahardja; The Design of an SRAM–Based Field–Programmable Gate Array—Part I: Architecture; IEEE Transaction on Very Large Scale Intergration (VLSI) Systems (Jun. 1999), vol. 7, No. 2, pp. 191–197.

Paul Chow, Soon Ong Seo, Jonathan Rose, Kevin Chung, Gerard Paezmonzon, Immanuel Rahardja; The Design of an SRAM–Based Field–Programmable Gate Array—Part II: Circuit Design and Layout; IEEE Transaction on Very Large Scale Intergration (VLSI) Systems (Sep. 1999), vol. 7, No. 3, pp. 321–330.

* cited by examiner

RECONFIGURABLE INTEGRATED CIRCUIT WITH A SCALABLE ARCHITECTURE

BACKGROUND OF THE INVENTION

1. Field of the Invention

The present invention relates to the field of integrated circuit (IC). More specifically, the present invention relates to the architecture of reconfigurable ICs.

2. Background Information

The art of design and manufacturing ICs is generally known. Over the years, as the technology of designing and manufacturing ICs continues to improve, increasing number of electronic elements are being packed into a single IC, and the interrelationship between these elements are increasingly complex. With increased density and complexity, the cost for making an IC manufacturing mask has increased substantially correspondingly.

Between different offerings of a modern IC product family, or between successive offerings, often times the functionalities are different only in a relatively small incremental way, when viewed in the context of the totality of its logic. Thus, in view of the high cost of a new IC mask as well as other factors, increasingly IC designers desire to have ICs that are partially reconfigurable to accommodate the small incremental changes in functionalities between the different offerings.

U.S. Pat. No. 5,574,388 discloses a reconfigurable IC designed for emulation application. The architecture including in particular the integrated debugging facilities was particularly suitable for the intended use. However, general purpose partially reconfigurable integrated circuits present a different set of challenges. One desirable attribute is scalability to provide more flexible tradeoffs between area consumption versus routability.

Thus, an improved reconfigurable IC architecture is desired.

SUMMARY OF THE INVENTION

An integrated circuit (IC) includes a number of function blocks, of which at least one is a reconfigurable function block. Each function block may be a reconfigurable function, a non-reconfigurable function or recursively expanded with additional "nested" function blocks interconnected with the same architecture. The IC further includes a number of external input pins, and a number of external output pins.

The elements, at least at the IC level, are coupled in a manner such that all input signals are routed from the external input pins to the function blocks through a first subset of crossbar devices, all internal signals are routed from one function block to another function block through a second subset of crossbar devices, and all output signals are routed from the function blocks to the external output pins through a third subsets of crossbar devices.

In one embodiment each crossbar device output has a single fanout. Additionally, each crossbar device may provide only one input to another crossbar device.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention.

Further, the phrase "in one embodiment" is used repeatedly. In general, the phrase does not refer to the same embodiment, although it may. The terms "comprising", "including", "having" and the like, as used in the present application, are synonymous.

Figure 1:
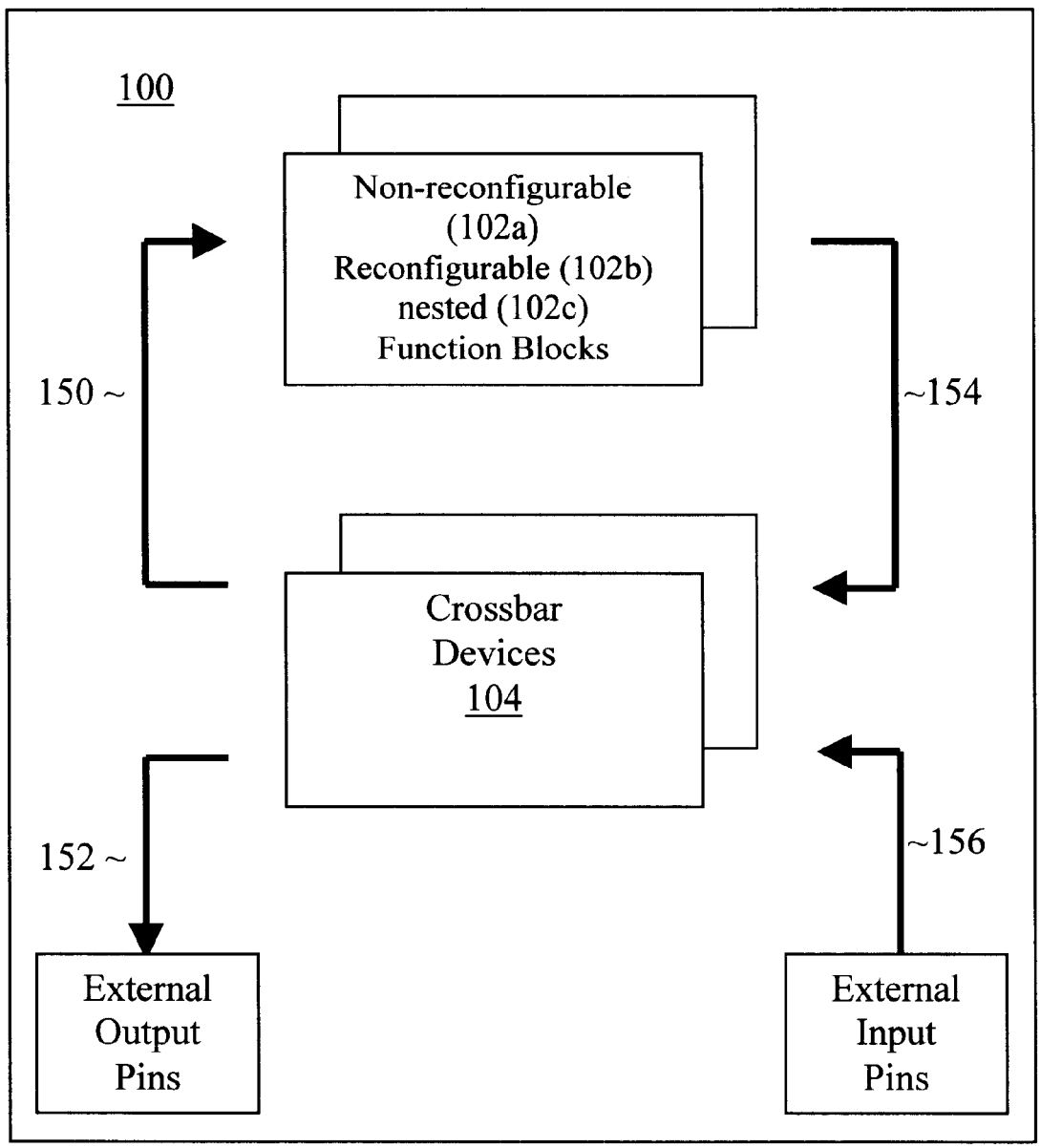
FIGS. 1–2 illustrate an overview of the reconfigurable integrated circuit of the present invention, incorporated with a scalable architecture, in accordance with one embodiment.

Referring now to FIG. 1, wherein a block diagram illustrating an overview of the reconfigurable IC of the present invention (100), in accordance with one embodiment. As illustrated, IC 100 includes a number of function blocks 102 and a number of crossbar devices 104. Further, IC 100 includes a number of external output pins as well as external input pins. Function blocks 102 provide the logic of IC 100, whereas, crossbar devices 104 provide the signal routing paths for routing signals into and out of IC 100, as well as in between the function blocks within IC 100. As will be described in more detail below, the elements are advantageously coupled together in accordance with a novel architecture to allow the desired routings to be accomplished in an easily scalable manner, providing more flexibility in trading off area consumption versus routability.

Function blocks 102 may include non-reconfigurable function blocks 102a, reconfigurable function blocks 102b, and/or collections of "nested" function blocks 102c. For examples, function blocks 102 may include non-reconfigurable function blocks 102a, such as processor core, memory controller, bus bridges, and the like. Additionally, or alternatively, function blocks 102 may include reconfigurable function blocks 102b, such as reconfigurable circuitry similar to those found in PLDs or FPGAs, reconfigurable to support alternate functions, such as between supporting the ISA bus or the EISA bus, or between supporting the I2C or SPI serial communication interface, and so forth. The function blocks within a "nested" function block 102c are organized and interconnected together in accordance with the same interconnect architecture for interconnecting function blocks 102, the external inputs and external outputs, and crossbar devices 104 at the IC level (also referred to as the "root" or "highest" or "outermost" level). Each collection of "nested" function blocks may include non-reconfigurable function blocks, reconfigurable function blocks, and/or collections of "nested" function blocks interconnected in accordance with the same interconnect architecture. Eventually, at the "deepest" nesting level (also referred to as the "lowest" or "innermost" nesting level), each of the function blocks are non-reconfigurable function blocks or reconfigurable function blocks, interconnected in accordance with the same interconnect architecture.

Each crossbar device 104 has a fixed number of inputs and a fixed number of outputs. All of its outputs can be routed from any input simultaneously without limitation (this also refers to a fully populated crossbar). Another important characteristic of the crossbar device 104 is that signal is always propagating through it in the same direction (i.e. inputs to outputs). But it can be implemented with any kind of crossbar device architecture like pass transistor bidirectional crossbar device or wired-or unidirectional crossbar device or buffered uni-directional crossbar device. As illustrated in FIG. 1, at the IC level, the elements are coupled to each other in the following manner, a) A first subset of crossbar devices 104 are routing the external input pins to a first subset of the function block 102 inputs through connections 156 and a first subset of connections 150;

b) In turn, a second subset of crossbar devices 104 are routing a first subset of the function block 102 outputs; to a second subset of the function block 102 inputs through a first subset of connections 154 and a second subset of connections 150;

c) further, a third subset of crossbar devices 104 are routing a second subset of the function block 102 outputs to the external output pins through a second subset of connections 154 and connections 152.

According, all external input pins may be provided to function blocks 102 through the first subset of crossbar devices 104. All internal.signals may be routed from one function block 102 to another function block 102 through the second subsets of crossbar devices 104, and all output signals may be routed from function blocks 102 to the external output pins through the third subset of crossbar devices 104.

Note that the first, second, and third subset of crossbar devices 104 may or may not overlap, and each of the three subsets may include the entire collection of the crossbar devices 104. Similarly, the first and the second subset of the function blocks 102 inputs may or may not overlap, and each of the two subsets may include the entire collection of function block 102 inputs. Likewise, the first and the second subset of the function blocks 102 outputs may or may not overlap, and each of the two subsets may include the entire collection of function block 102 outputs.

Figure 2:
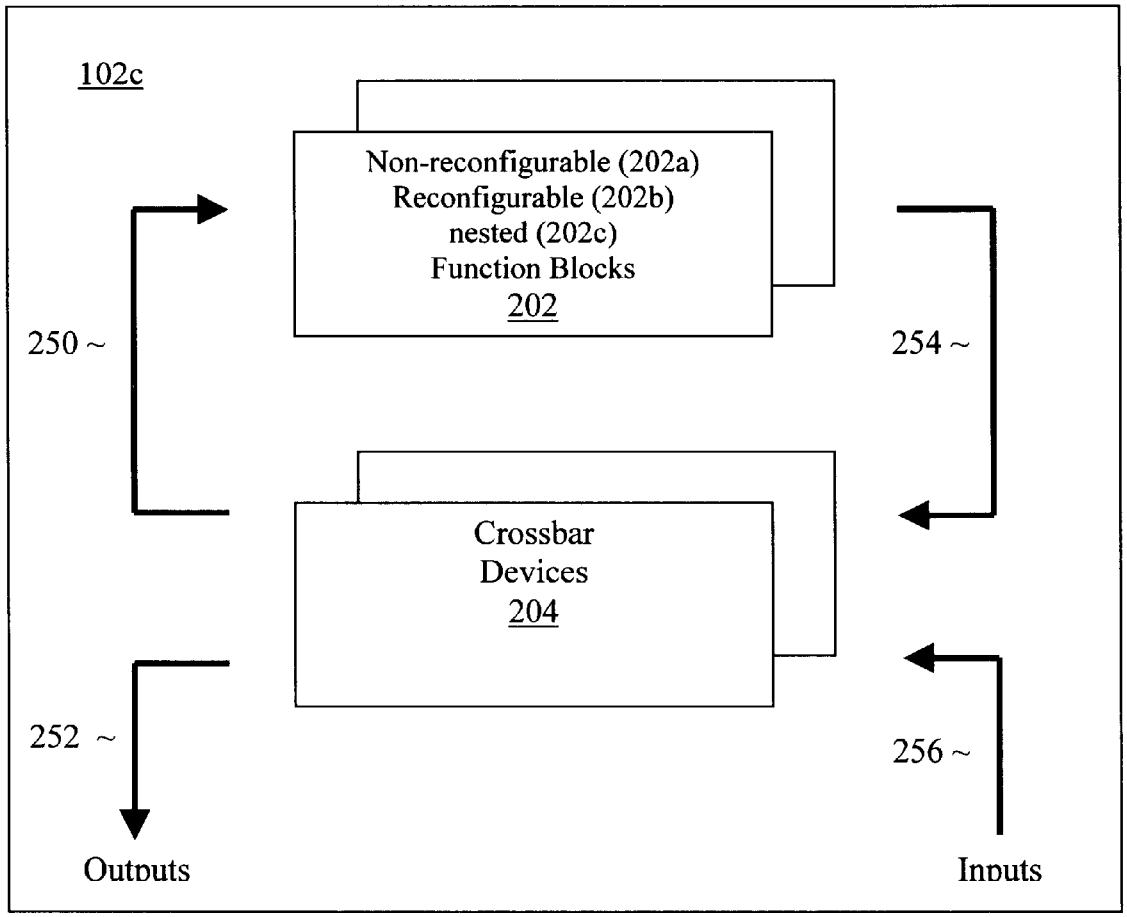

As illustrated in FIG. 2, each collection of nested function blocks 102c includes a number of function blocks 202 (which may be non-reconfigurable function blocks 202a, reconfigurable function blocks 202b, or collections of "nested" function blocks 202c) and crossbar devices. The function blocks 202 topologically occupy analogous positions of function blocks 102 at the IC level, whereas the crossbar devices 204 topologically occupy analogous positions of the crossbar devices 104 at the IC level. The inputs topologically occupy analogous positions of the external input pins at the IC level; and the outputs topologically occupy analogous positions of the external output pins of the IC level. Accordingly, a) A first subset of crossbar devices 204 are routing the inputs to a first subset of the function block 202; inputs through connections 256 and a first subset of connections 250;

b) In turn, a second subset of crossbar devices 204 are routing a first subset of the function block 202 outputs to a second subset of the function block 202 inputs through a first subset of connections 254 and a second subset of connections 250;

c) further, a third subset of crossbar devices 204 are routing a second subset of the function block 202 outputs to the outputs through a second subset of connections 254 and connections 252.

According, all inputs may be provided to function blocks 202 through the first subset of crossbar devices 204. All internal signals may be routed from one function block 202 to another function block 202 through the second subsets of crossbar devices 204, and all output signals may be routed from function blocks 202 to the external outputs through the third subset of crossbar devices 204.

Similar to the IC level, the first, second and third subset of crossbar devices 204 may or may not overlap, and each of the three subsets may include the entire collection of the crossbar devices 204. Similarly, the first and the second subset of the function blocks 202 inputs may or may not overlap, and each of the two subsets may include the entire collection of function block 202 inputs. Likewise, the first and second subset of the function blocks 202 outputs may or may not overlap, and each of the two subsets may include the entire collection of function block 202 outputs.

Each crossbar device 204 is of the same type as the IC level crossbar devices 104.

Accordingly, under the present invention, each of function blocks 102 of the present invention may be recursively expanded to provide better tradeoffs between area consumption versus routability. For implementations of IC 100 requiring relatively small amount of signal routing paths, a handful of crossbar devices and a single level of function blocks may be employed and interconnected in accordance with the interconnect architecture of the present invention. However, for implementations of IC 100 requiring more function blocks, one or more function blocks 102 may be recursively expanded one or more times (with "elements" of each nesting level being interconnected in the same manner as the elements are interconnected at the IC level). Correspondingly, a number of inputs and outputs are provided for the function blocks at each recursion level. Thus, IC 100 of the present invention is highly scalable, and flexible in balancing area consumption, speed and routability.

While for ease of understanding, the above description refers to IC 100 as having external input pins and external output pins, the present invention may be practiced with external pins that are capable only of one of input or output, or with external pins that are configurable to be input or output.

Figure 3:
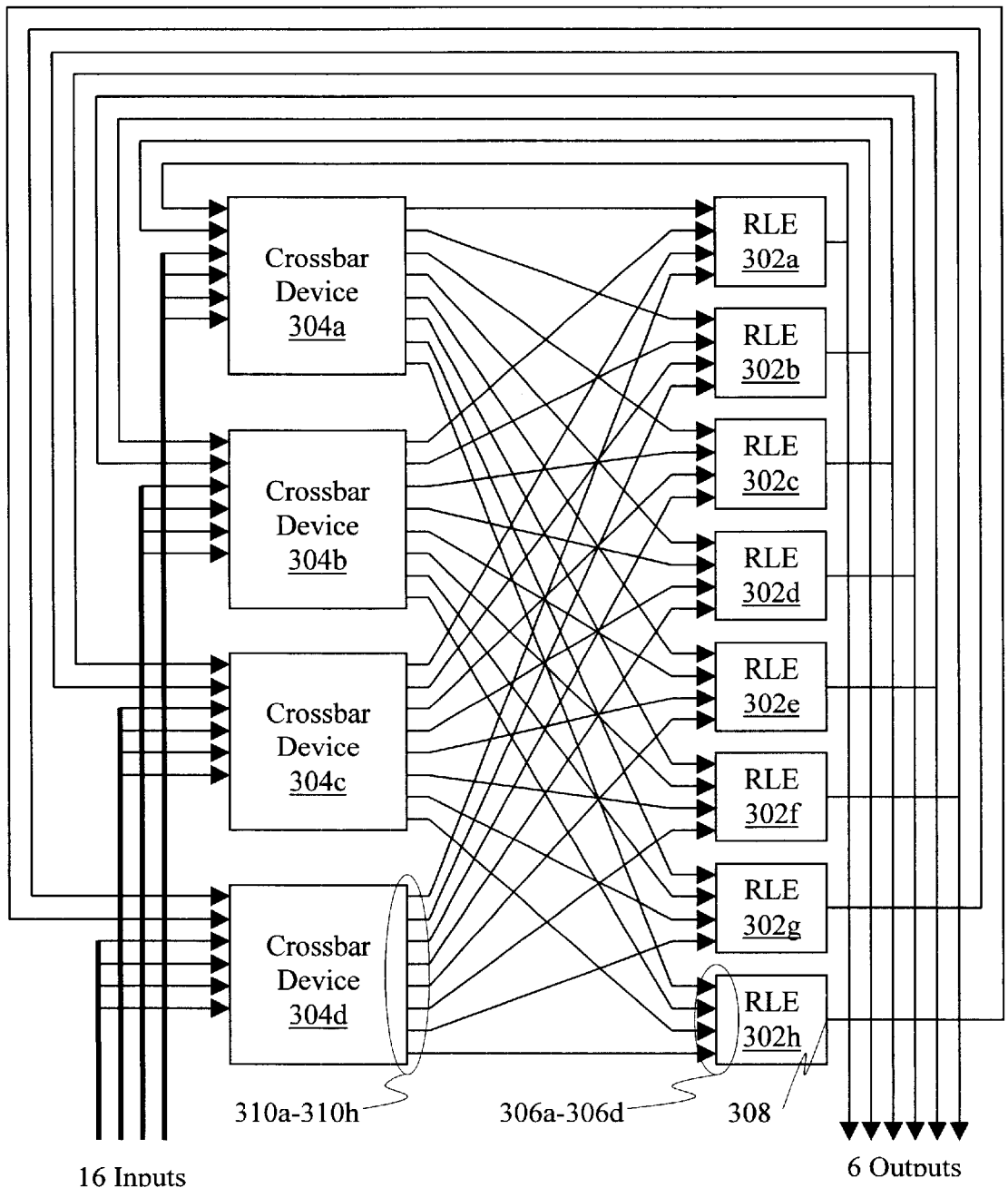
FIG. 3 illustrates a reconfigurable function block in further details, in accordance with one embodiment.

FIG. 3 illustrates one embodiment of reconfigurable function block 102b of FIG. 1 and reconfigurable function block 202b of FIG. 2 in further details. This reconfigurable function block includes a collection of reconfigurable logic elements (RLE). An RLE is an element that can be configured to perform a simple logic function representing few logic gates (typically less than 10) and/or a memorizing function such as a flip flop. For example the simple logic function can be done using a 16 bit RAM used as a 4 inputs 1 output truth table. As illustrated, for the embodiment, reconfigurable function block 102b includes m RLE 302a–302h (m=8) with n inputs 306a–306d (n=4) and o outputs 308 (o=1), and n crossbar devices 304a–304d (the number of crossbar devices is equal to the number of RLE inputs) with m outputs 310a–310h (the number of crossbar device outputs is equal to the number of RLEs). RLEs 302a–302h are reconfigurable to implement a number of logic functions, whereas crossbar devices 304a–304d provide flexibility in routing input signals to the RLEs, and routing signals between the RLEs. The outputs of crossbar devices 304a–304d are coupled to the inputs of each of RLE 302a–302h (since the number of crossbar outputs equals the number of RLE, each RLE receives one input from each of the crossbars devices), whereas, the outputs of each of RLE 302a–302h are maximally coupled to the inputs of each of crossbar devices 304a–304d. That is, if there are n1 outputs from the RLEs and there are n2 crossbar devices, then each RLE output is interconnected to one crossbar device, and the difference between the number of interconnections provided to the crossbar device provided with the most number of interconnections and the number of interconnections provided to the crossbar device provided with the least number of interconnections is 1. For the illustrated embodiment, since there are eight outputs from RLEs 302a–302h and four crossbar devices 304a–304d, each crossbar device receives inputs from two RLEs.

The inputs of the reconfigurable function block are directly provided to the inputs of crossbar devices 304a–d and the outputs of the reconfigurable function block are directly provided by a subset of the RLE outputs (which may include the entire collection of the RLE outputs). In the illustrated embodiment, each of the crossbar devices 304a–d receives 4 inputs and only 6 RLEs 302a–f provide outputs.

Note that for ease of illustration, the above description refers to reconfigurable function block 102b having 8 RLEs, 6 outputs and 16 inputs. The present invention may be practiced, with the same architecture, having more RLEs, more outputs and more inputs.

Figure 4:
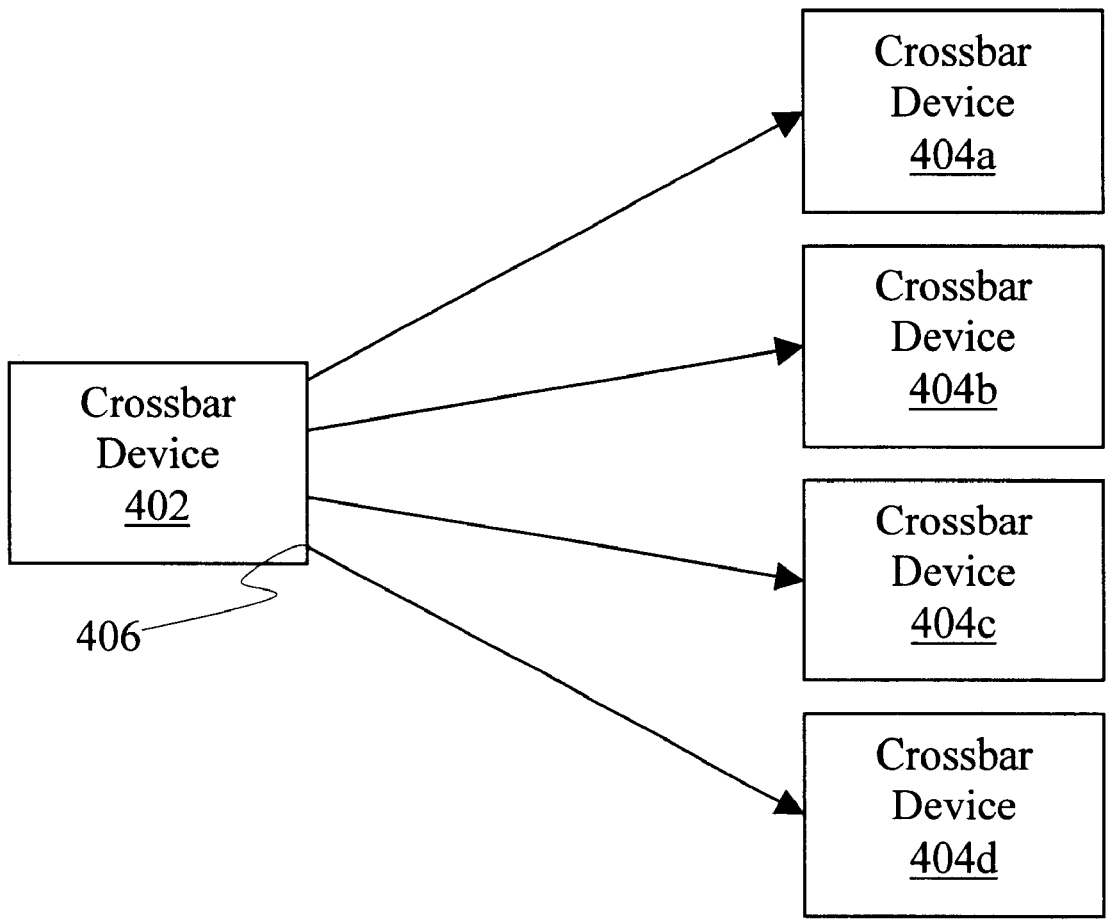
FIG. 4 illustrates interconnections between crossbars, in accordance with one embodiment.

FIG. 4 illustrates the coupling between the crossbar devices of one embodiment of IC 100. When nested function blocks 102c/202c of IC 100 are totally expanded, IC 100 reduces to a collection of non-reconfigurable function blocks 102a/202a, reconfigurable function blocks 102b/202b, crossbar devices, external input pins and external output pins interconnected together. To increase, routability of IC 100, preferably a maximum number of different routing paths between function block outputs and function block inputs, between external input pins and function block inputs and between function blocks outputs and external output pins is provided. That is, only one output of crossbar device 402 is connected to each of the other crossbar devices 404a–404d. Further, to provide a higher speed, the capacitive load of each of the crossbar device outputs should be reduced to the minimum. That is, any crossbar device output 406 is connected to a single crossbar device input. Accordingly, under the present invention, crossbar devices 402 provides inputs to a maximum number of crossbar devices 404a–404d, therefore maximizing the number of routing paths, while reducing its output capacitive loading to the minimum.

Figure 5:
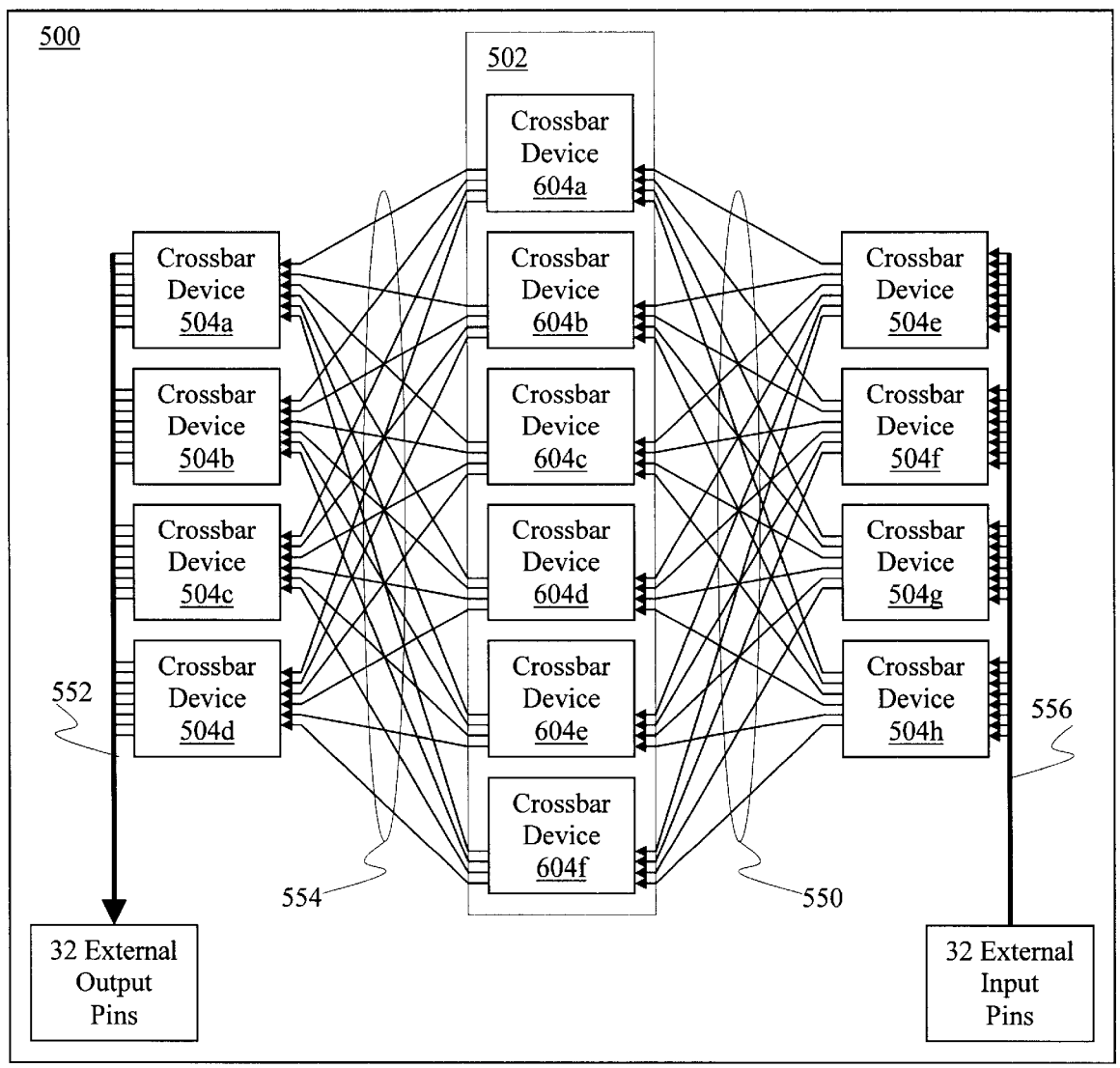
FIGS. 5–7 illustrate one implementation of the reconfigurable IC of FIGS. 1–2 in further details.
Figure 6:
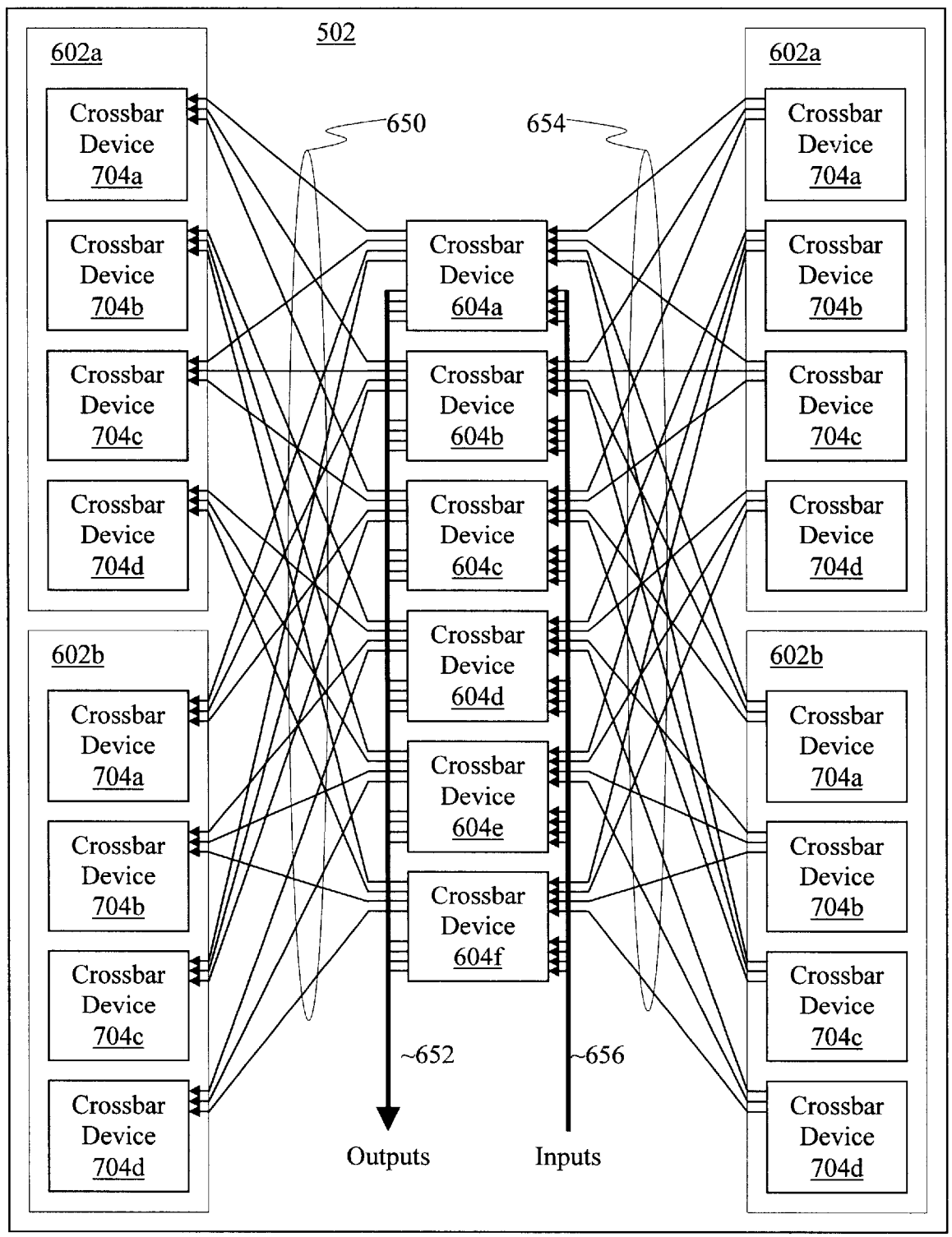
Figure 7:
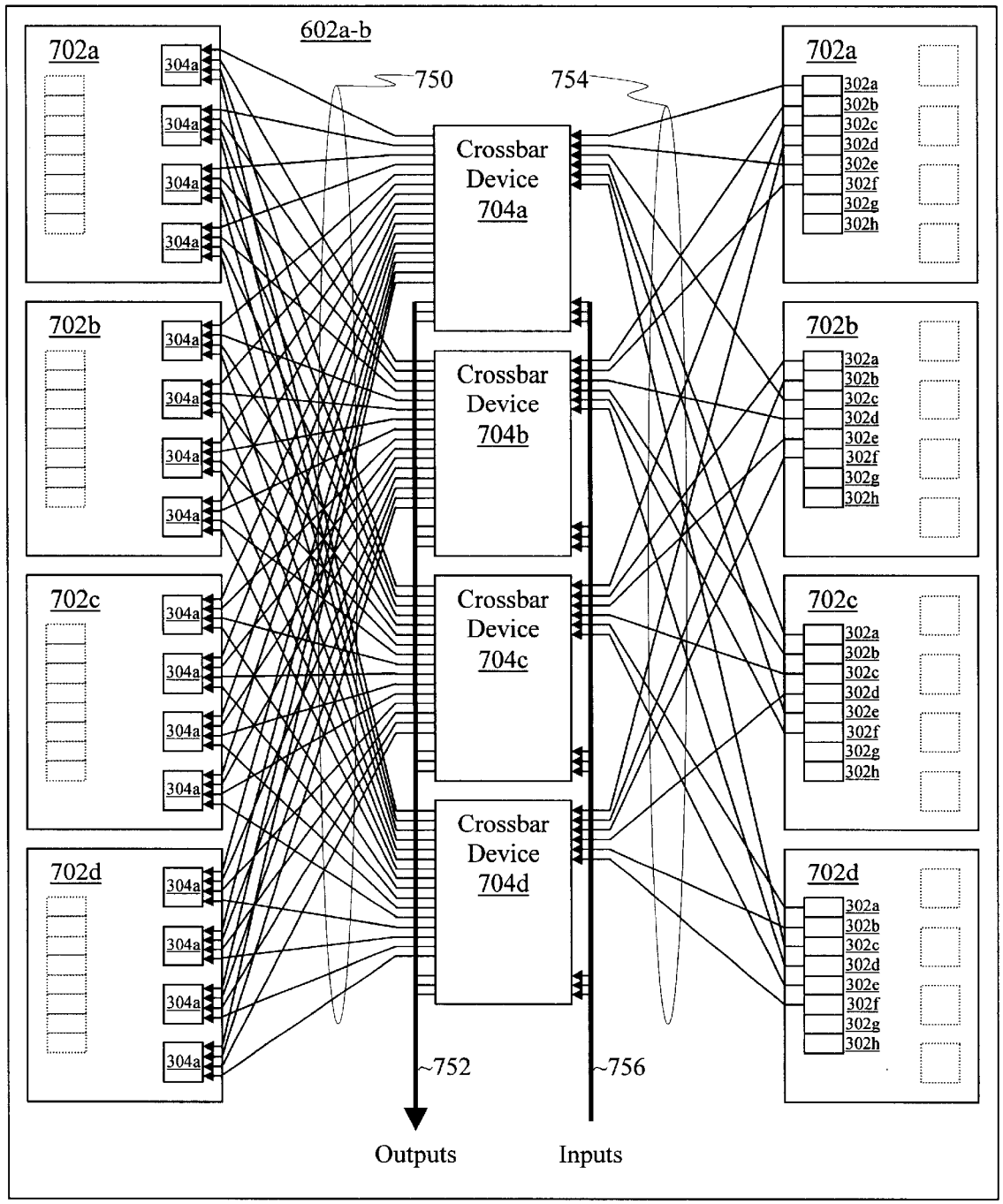

FIGS. 5–7 illustrate an implementation of reconfigurable IC of FIGS. 1–2 in further details. As illustrated, IC 500 includes 1 collection of "nested" function blocks 502, 8 crossbar devices 504a–f, 32 external output pins, 32 external input pins and connections 550 552 554 556. Crossbar devices 504e–h are the first subset of crossbar devices at the IC level, routing the external input pins to the nested function block 502 inputs through connections 556 and 550. Crossbar devices 504a–d are the third subset of crossbar devices at the IC level, routing the nested function block 502 outputs to the external output pins through connections 554 552. In the present implementation, the second subset of crossbar devices at the IC level is empty. Accordingly, the collection of "nested" function blocks 502 topologically occupy the position of function blocks 102 at the IC level, crossbar devices 504a–h topologically occupy the position of crossbar devices 104 of the IC level, and connections 550 552 554 556 topologically occupy respectively the position of connections 150 152 154 156 of the IC level. Crossbar devices 604a–f are some of the crossbar devices of nested function block 502 (other nested elements of nested function block 502 not shown).

FIG. 6 illustrates one implementation of nested function block collection 502. Nested function block collection 502 includes 2 nested function blocks 602a–b (for the purpose of illustration, blocks 602a–b are represented two times to clarify the input and output connection pattern), 6 crossbar devices 604a–f, 24 inputs, 24 outputs and connections 650 652 654 656. Crossbar devices 604a–f are the first, second and third subsets of crossbar devices at the nested function block level, respectively routing the inputs to the function block 602a–b inputs through connections 656 650, the function block 602a–b outputs to the function block 602a–b inputs through connections 654 650 and the function block 602a–b outputs to the outputs through connections 654 652. Accordingly, nested function blocks 602a–b topologically occupy the positions of function blocks 202 of the nested function block level, whereas crossbar devices 604a–f topologically occupy the positions of crossbar devices 204 of nested function block level, and connections 650 652 654 656 topologically occupy respectively the positions of connections 250 252 254 256 of the nested function block level. Crossbar devices 704a–d are the crossbar devices of nested function block 602a–b (other nested elements of nested function block 602a–b not shown).

FIG. 7 illustrates one implementation of nested function blocks 602a–b. Nested function blocks 602a–b include 4 programmable function blocks 702a–d (for the purpose of illustration, blocks 702a–d are represented two times to clarify the input and output connection pattern), 4 crossbar devices 704a–d, 12 inputs, 12 outputs and connections 750 752 754 756. Crossbar devices 704a–d are the first, second and third subsets of crossbar devices at the nested function block level, respectively routing the inputs to the function block 702a–d inputs through connections 756 750, the function block 702a–d outputs to the function block 702a–d inputs through connections 754 750 and the function block 702a–d outputs to the outputs through connections 754 752. Accordingly, nested function block 702a–d topologically occupy the positions of function blocks 202 of the nested function block level, crossbar devices 704a–d topologically occupy the positions of crossbar devices 204 of the nested function block level, and connections 750 752 754 756 topologically occupy respectively the positions of connections 250 252 254 256 of the nested function block level. Programmable function blocks 702a–d are the same implementation of the programmable function block described above and illustrated in FIG. 3.

Note that each of the crossbar devices of IC 500 has a fixed number of inputs and a fixed number of outputs, and therefore one important characteristic of the present invention is that signal is always propagating through the crossbar devices in the same direction. But the present invention may be practiced with any kind of crossbar device architecture like pass transistor bidirectional crossbar device or wired-or unidirectional crossbar device or: buffered unidirectional crossbar device.

Further, all connections between the crossbar devices of IC 500 are done accordingly with the rules disclosed above and illustrated FIG. 4.

Note that for ease of illustration and understanding, IC 500 is purposely illustrated with a small number of elements. However, those skilled in the art will appreciate that. IC 500 implementation may be scaled up to realistically represent a commercial product. For example:

a) IC level may include 16 "48-inputs 48-outputs" crossbar devices, 1 first level nested function block, 384 input pins and 384 output pins;

b) first level nested function block may include 48 "32-inputs 48-outputs" crossbar devices, 24 second level nested function block, 384 inputs and 384 outputs;

c) second level nested block may include 16 13-inputs 35-outputs crossbar devices, 8 programmable function blocks, 80 inputs and 48 outputs; and d) programmable function block may include 4 "20-inputs 16-outputs" crossbar devices, 16 "4-inputs 1-output" RLEs, 64 inputs and 16 outputs.

Accordingly, IC has 3092 RLEs, 384 external output pins and 384 external input pins.

Thus, a fully or partially reconfigurable integrated circuit having a scalable architecture has been described. While the integrated circuit of the present invention has been described in terms of the above illustrated embodiments, those skilled in the art will recognize that the invention is not limited to the embodiments described. Further, while the present invention has been described as an integrated circuit, the present invention may be practiced as an embeddable logic block forming a portion of an IC instead. Accordingly, the present invention can be practiced with modification and alteration within the spirit and scope of the appended claims. The description is thus to be regarded as illustrative instead of restrictive on the present invention.

What is claimed is:

1. An apparatus comprising:

first plurality of inputs;

first plurality of outputs;

first one or more function blocks; and first plurality of crossbar devices coupled to the first plurality of inputs, the first plurality of outputs and the first one or more function blocks to exclusively couple said first inputs to said first one or more function blocks, said first one or more function blocks to each other, and said first one or more function blocks to said first outputs;

wherein said first one or more function blocks include at least a first function block comprising one or more recursively nested collections of inputs, outputs, one or more function blocks and crossbar devices, with the crossbar devices of each nested collection interconnecting the inputs, outputs, and one or more function blocks of the nested collection in the same manner said first plurality of crossbar devices couple said first inputs to said first one or more function blocks, said first one or more function blocks to each other, and said first one or more function blocks to said first outputs.

2. The apparatus of claim 1, wherein said first plurality of crossbar devices comprise a first, a second, a third subset, with said first subset routing said first plurality of inputs to inputs of said first one or more function blocks, said second subset routing outputs of said first one or more function blocks to said inputs of said first one or more function blocks, and said third subset routing outputs of said first one or more function blocks to said first plurality of outputs.

3. The apparatus of claim 2, wherein at least two of said subsets are the same subset.

4. The apparatus of claim 2, wherein all three subsets are the same subset.

5. The apparatus of claim 1, wherein said first function block comprises second plurality of inputs;

second plurality of outputs;

second one or more function blocks; and second plurality of crossbar devices coupled to said second plurality of inputs, said second plurality of outputs and said second one or more function blocks to exclusively couple said second plurality of inputs to said second one or more function blocks, said second one or more function blocks to each other, and said second one or more function blocks to said second plurality of outputs in the same manner said first plurality of crossbar devices couple said first inputs to said first one or more function blocks, said first one or more function blocks to each other, and said first one or more function blocks to said first outputs.

6. The apparatus of claim 1, wherein said second plurality of crossbar devices comprise a first, a second, a third subset, with said first subset routing said second plurality of inputs to inputs of said second one or more function blocks, said second subset routing outputs of said second one or more function blocks to said inputs of said second one or more function blocks, and said third subset routing outputs of said second one or more function blocks to said second plurality of outputs.

7. The apparatus of claim 6, wherein at least two of said subsets are the same subset.

8. The apparatus of claim 6, wherein all three subsets are the same subset.

9. The apparatus of claim 5, wherein said second one or more function blocks include a second function block comprising one or more recursively nested collections of inputs, outputs, one or more function blocks and crossbar devices, with the crossbar devices of each nested collection interconnecting the inputs, outputs, and one or more function blocks of the nested collection in the same manner said first plurality of crossbar devices couple said first inputs to said first one or more function blocks, said first one or more function blocks to each other, and said first one or more function blocks to said first outputs.

10. The apparatus of claim 9, wherein said second function block comprises third plurality of inputs;

third plurality of outputs;

third one or more function blocks; and third plurality of crossbar devices coupled to said third plurality of inputs, said third plurality of outputs and said third one or more function blocks to exclusively couple said third plurality of inputs to said third one or more function blocks, said third one or more function blocks to each other, and said third one or more function blocks to said third plurality of outputs in the same manner said second plurality of crossbar devices couple said second inputs to said second one or more function blocks, said second one or more function blocks to each other, and said second one or more function blocks to said second outputs, and said first plurality of crossbar devices couple said first inputs to said first one or more function blocks, said first one or more function blocks to each other, and said first one or more function blocks to said first outputs.

11. The apparatus of claim 1, wherein said apparatus is an embedded logic block to be used to form an integrated circuit.

12. The apparatus of claim 1, wherein said apparatus is an integrated circuit.

13. The apparatus of claim 1, wherein at least one of said one or more recursively nested collections of inputs, outputs, one or more function blocks, and crossbar devices comprises m reconfigurable logic blocks, each logic block having n inputs and o outputs, m, n and o being integers, with a subset of m by o outputs provided as outputs of the at least one collection; and n crossbar devices, each having m outputs correspondingly coupled to said n inputs of said m reconfigurable logic blocks, and outputs of said m reconfigurable logic blocks are maximally coupled to a first subset of inputs of said n crossbar devices and inputs of the at least one nested collection coupled to a second subset of inputs of said n crossbar devices, wherein integers m, n and o are greater then 0.

14. The apparatus of claim 13, wherein each crossbar device output of said apparatus has a single fanout, and each crossbar device of said apparatus provides only one input to another crossbar device of the apparatus.

15. The apparatus of claim 1, wherein each crossbar device output of said apparatus has a single fanout, and each crossbar device of said apparatus provides only one input to another crossbar device of the apparatus.

16. A function block comprising m reconfigurable logic blocks, each logic block having n inputs and o outputs, m, n and o being integers, and a subset of said m by o outputs being provided as outputs of said function block; and n crossbar devices, each having m outputs correspondingly coupled to said n inputs of said m reconfigurable logic blocks, and outputs of said m reconfigurable logic blocks are maximally coupled to a first subset of inputs of said n crossbar devices and inputs of said function block coupled to a second subset of inputs of said n crossbar devices, wherein integers m, n and o are greater then 0.

17. The function block of claim 16, wherein said function block is an embedded logic block to be used to form an integrated circuit.

* * * * *